Figure 1:
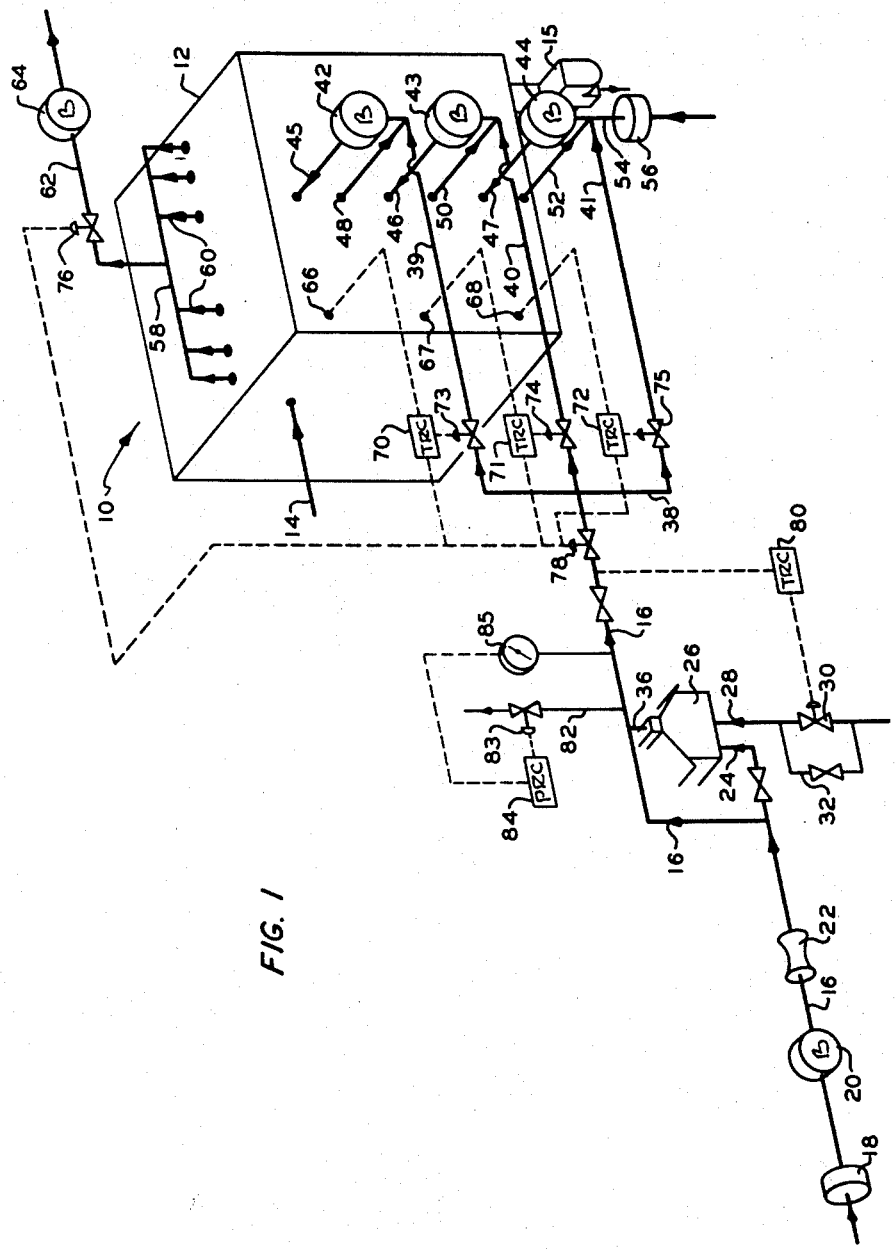

INVENTORS
A.J. ANDREWS
L.W. POLLOCK

BY *Hudson & Young*

ATTORNEYS

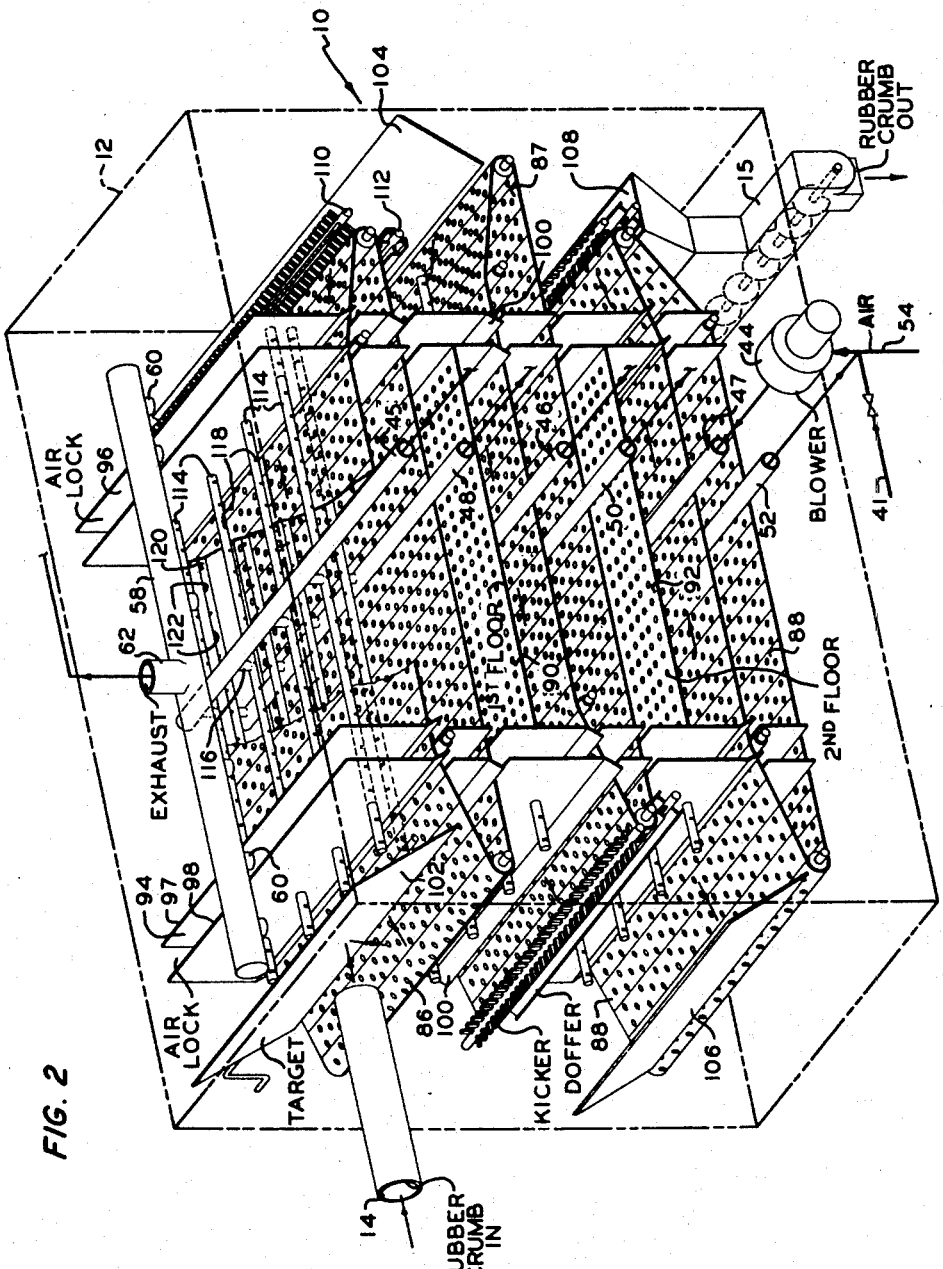

United States Patent Office

3,102,795
Patented Sept. 3, 1963

3,102,795
APPARATUS AND PROCESS FOR DRYING PARTICULATE SOLIDS
Alvin J. Andrews and Lyle W. Pollock, Bartlesville, Okla., assignors to Phillips Petroleum Company, a corporation of Delaware
Filed Apr. 25, 1960, Ser. No. 24,293
13 Claims. (Cl. 34—33)

This invention relates to an improved process and apparatus for drying particulate solids and, particularly, synthetic rubber crumb.

It is conventional practice to dry particulate solids such as synthetic rubber crumb in an apron dryer containing multiple passes thru which the rubber is passed back and forth thru the dryer on endless belts at different levels. In one such dryer, the crumb in each separate pass is contacted with separate streams of drying gases which are exhausted from the pass into which they enter. The major portion of the drying is effected in the uppermost pass into which the rubber is introduced from the washing step. This uppermost drying stage or pass requires a great deal more heat for evaporation of a greater quantity of water from the wet material than the lower passes. The effluent gases from the lower passes are already heated and have relatively low relative humidity.

In addition to the problem of economical heat utilization involved in apron type dryers, the problem of adequate temperature control in the various passes presents itself. In drying rubber crumb, adequate temperature control to prevent overheating is absolutely essential in order to avoid fire within the dryer due to the presence of $O_2$. Because of this fact, heating with steam coils within the dryer is frequently resorted to but this type of drying is more expensive than drying with hot gases produced by combustion of fuel gas with air in a furnace outside of the dryer.

It is an object of the present invention to provide an improved process and apparatus for drying moist particulate solids such as synthetic rubber crumb. Another object is to provide a process and apparatus for drying particulate solids more economically with improved utilization of heat. A further object is to provide an improved method and controls for maintaining optimum temperatures within the several passes of an apron-type dryer and process. Other objects of the invention will become apparent upon consideration of the accompanying disclosure.

A broad aspect of the invention comprises separately feeding hot combustion gas to the several passes of an apron type dryer being utilized in drying particulate solids, passing air up thru the dryer from the lowermost pass thru the uppermost pass, recirculating drying gas (including the combustion gas and air) within each pass down thru the material being dried, and withdrawing all of the effluent gas from the uppermost pass of the dryer, and means for effecting this process. Another aspect of the invention comprises burning fuel gas with air, tempering the resulting combustion gas with air to a temperature in the range of 300 to 800° F., passing separate streams of the tempered gas into each section of the dryer, passing air up thru the dryer from the lowermost pass to the uppermost, withdrawing effluent gas from tht dryer from the uppermost pass, sensing the temperature in each pass, and controlling the flow of hot combustion gas into each pass in response to the sensed temperature in each respective pass to maintain the desired temperature therein.

A more complete understanding of the invention may be had by reference to the accompanying schematic drawing of which FIGURE 1 is an isometric view of an apron dryer with supply lines and controls for maintaining desired temperatures; and FIGURE 2 is an exposed isometric view of the dryer of FIGURE 1 with a portion of the uppermost belt cut away to show the piping arrangement above and below the belt.

Referring to FIGURE 1, an apron dryer 10 is provided with a metal shell 12. An inlet conveyor 14 feeds material to be dried into the uppermost pass within the dryer and a conveyor 15 removes material from the bottom of the dryer below the lowermost pass. The system for preparing and feeding hot drying gas to the dryer comprises air line 16 in which are positioned a screen 18, a blower 20, and flow-rate sensing device 22. A branch line 24 from air line 16 connects with a furnace 26 which is also fed by fuel gas line 28 containing a motor valve 30 and a valved bypass line 32. Air line 16 connects with furnace effluent line or stack 36 and leads into a manifold 38. Individual feed lines 39, 40, and 41 lead from manifold 38 to the inlets of blowers 42, 43, and 44, respectively, the outlets of which connect to lines 45, 46, and 47, respectively, leading into the separate passes of the dryer. Recycle lines 48, 50, and 52 connect with lines 39, 40, and 41, respectively, or with the inlets of the blowers. An air line 54 containing a screen 56 leads into line 41 to supply outside air directly to the lowermost pass.

Effluent gas from the dryer passes into manifold 58 from individual effluent lines 60, passing thru the top of the dryer. Exhaust line 62 connects with line 58 and is provided with exhaust blower 64.

The control system comprises temperature sensing means 66, 67, and 68 positioned in the three passes, temperature-recorder-controllers 70, 71, and 72, in control of motor valves 73, 74, and 75, respectively, in lines 39, 40, 41. A motor valve 76 in line 62 and a similar motor valve 78 in line 16, carrying tempered combustion gas to manifold 38, are also tied into the temperature control system and are normally open but close when the temperature at any one of the three sensing points 66, 67, and 68 exceeds a maximum set temperature. Temperature-recorder-controllers 70, 71, and 72 are responsive to the sensed temperature in their respective passes as measured by instruments 66, 67, and 68 so as to control the flow of hot combustion gas to the blowers feeding their respective passes. Blower 64 is also automatically shut down (by means not shown) when the temperature exceeds a set maximum in any of the passes so as to close valve 76.

Temperature-recorder-controller 80 is sensitive to the temperature in line 16 downstream of furnace stack 36 and is in control of motor valve 30 in fuel line 28 so as to maintain a predetermined temperature in the tempered combustion gas by regulating the amount of fuel burned and therefore the heat produced in furnace 26. Blower 20 operates at a constant speed to produce a constant flow of air in line 16. Blower 64 is of greater capacity than blower 44 and is operated so as to pull into the dryer thru line 54 a predetermined flow rate of air to be admixed with the tempered combustion gas within the dryer.

A vent line 82 containing motor valve 83 leads from line 16 downstream of stack 36. Pressure-recorder-controller 84 is sensitive to the pressure in line 16 as sensed by instrument 85 and bleeds gas to the atmosphere thru line 82 when the pressure in line 16 exceeds a set maximum.

Referring to FIGURE 2, dryer 10 is divided into three compartments or passes each of which contains a perforate endless belt conveyor. These conveyors are designated 86, 87, and 88 in the uppermost, middle, and lowermost passes, respectively. Perforate floors 90 and 92 separate the interior of the dryer into three horizontal compartments or passes but allow upward passage of gases thru the entire dryer. These floors extend laterally across the dryer and longitudinally between air locks 94 and 96. Each air lock comprises a pair of spaced apart bulkheads 97 and 98, each provided with vanes 100 thru which the conveyor belts pass to maintain a loose seal therewith. A baffle 102 is positioned at the entrance of the first pass opposite pneumatic conveyor 14 to serve as a target for the rubber crumb blown into the pass and to distribute same on conveyor belt 86. Baffle 104 is positioned at the end of the first pass in inclined position to guide the crumb falling from the delivery end of conveyor belt 86. A similar baffle 106 is positioned intermediate the delivery end of conveyor belt 87 and the receiving end of conveyor belt 88. Hopper 108 is positioned at the delivery end of conveyor belt 88 to receive the dried crumb and deliver the same into conveyor-receiver 15.

A conventional kicker 110 and a doffer 112 are positioned at the delivery end of each conveyor belt to assure removal of the rubber crumb from the belt so that it is delivered to the next succeeding pass or belt and finally into hopper 108.

The conduit system for circulating drying gas thru the material on the belts comprises feeder lines 45, 46, and 47 leading from their respective blowers and recycle lines 48, 50, and 52 returning to their respective blower inlets. Each feeder line is connected with a series of distribution conduits 114 by means of conduits 116. These distribution conduits extend longitudinally of the belts in uniformly spaced-apart relation and are provided with outlets 118 along their undersides of increasing outlet area from the midsection to each end of the conduit to compensate for reduced pressure in the outer ends of the conduits and provide for better distribution of gas. Recycle lines 48, 50, and 52 are each provided with a series of pickup conduits 120 extending longitudinally under the upper run of the conveyor belts. These pickup conduits are constructed in the same manner as the distribution conduits but with their openings 122 spaced along the upper side thereof. Each pass is provided with similar gas distribution and recycle pickup conduit systems, as shown for the first pass, but omitted for the sake of clarity.

In operation, fuel gas is burned with air in furnace 26 and the resulting combustion gas is blended with air in line 16 to provide a selected temperature in the range of 300 to 800° F. In drying rubber crumb, it has been found advantageous to control the temperature of the gas in line 16 downstream of the furnace at about 700° F. This drying gas is passed thru individual feed lines 39, 40, and 41 under the control of their respective flow control valves 73, 74, and 75 to maintain a desired drying temperature in each pass when the gas is blended with air introduced thru line 54 and with recycle gas. This control is effected by temperature recorder controllers 70, 71, and 72 to maintain the temperatures in the various passes in the range of 150 to 225° F. The temperatures can be maintained about the same in each pass or progressively lower from the first pass to the last or vice versa. However, it is preferred to maintain the highest temperature in the first pass with lower temperatures in the second and third passes.

Blowers 42, 43, and 44 force the drying gas thru the feed lines 45, 46, and 47, respectively, to the different passes, picking up recycle gas thru lines 48, 50, and 52 which is blended with the incoming drying gas. Blower 44 also brings in atmospheric air thru line 54 to mix with the drying gas in line 47.

The drying gas, including recycle gas from each pass, is forced thru the distribution conduit system including conduits 114 onto the crumb on the conveyor belt in each pass and a substantial portion of the drying gas and moisture from the crumb is picked up by conduits 120 for recycling thru the distribution system via the recycle conduits. The capacity of blower 64 is substantially greater than the capacity of blower 44 so that the flow rate of effluent gas in line 62 which takes off manifold 58 is substantially greater than the flow rate of gas in line 16, thereby inducing a substantial flow of atmospheric air thru line 54 into the suction of blower 44. In this manner, the overall movement of drying gas thru the drier is upwardly from the last pass to the first, but there is downward flow of drying gas within each pass because of the arrangement of the gas distribution conduits above the upper run of the belt in each pass and the pick up conduit system, including conduits 120, directly under the upper run of the belt in each pass.

Because of the greater portion of the drying being effected in the first pass, the relative humidity of the drying gas in the second and third passes is lower than that in the first pass and this drying gas from the second and third passes contains valuable heat so that it functions effectively as drying gas for earlier passes to which it flows due to exhaust blower 64.

As stated hereinbefore when the temperature in any one of the passes, as sensed by instruments 66, 67, and 68, reaches a dangerous maximum, valve 78 in line 16 is closed and also valve 76 in line 62. All of the blowers are also automatically shut down by a control arrangement not shown.

To illustrate the invention, when rubber crumb of the character described below from a commercial plant is dried in a dryer constructed substantially as shown in the drawing, the results set forth hereinafter are obtained:

Rubber is prepared from emulsion polymerization at 41° F. and at a conversion of 60 percent of the following recipe:

| Ingredient— | Parts by weight |
|---|---|
| Butadiene | 75 |
| Styrene | 25 |
| Water | 180 |
| Rosin soap, K salt | 4.5 |
| Tamol N [1] | 0.15 |
| $Na_3PO_4 \cdot 12H_2O$ | 0.80 |
| Para-methane hydroperoxide | 0.12 |
| $FeSO_4 \cdot 7H_2O$ | 0.20 |
| $K_2P_4O_7$ | 0.30 |
| Tert-dodecylmercaptan | 0.20 |
| Shortstop [2] | 0.20 |
| Anti-oxidant [3] | [4] 1.25 |

[1] Sodium salt of a naphthalene sulfonic acid condensed with formaldehyde.
[2] 2:1 weight ratio mixture of sodium dimethyldithiocarbamate and sodium polysulfide.
[3] Diphenylamine-acetone reaction product.
[4] Based on rubber.

The rubber polymer or crumb having a water content of 35 weight percent is directed to the subject drier at a rate of 5,000 pounds per hour of dry rubber. The crumb enters the top of the apron-drier and is passed successively by three conveyor belts through the three passes where moisture is removed by both countercurrent and parallel gas flow. This drying gas is a combination of flue gases and air. The flue gases result from the burning of natural gas and air in the following proportions:

| | Pounds per hour |
|---|---|
| $CH_4$ | 262 |
| $N_2$ | 27,150 |
| $O_2$ | 8,230 |
| $H_2O$ | 662 |

The combustion products so formed are:

| | Pounds per hour |
|---|---|
| $CO_2$ | 724 |
| $H_2O$ | 592 |

Air induced directly into the lower compartment of the drier is composed of:

| | Pounds per hour |
|---|---|
| $N_2$ | 39,900 |
| $O_2$ | 12,100 |
| $H_2O$ | 974 |

At 86° or ambient temperature, this air has a relative humidity of 70%.

Exhaust gas from the top of the apron-drier comprises:

| | Pounds per hour |
|---|---|
| $N_2$ | 67,050 |
| $O_2$ | 19,276 |
| $H_2O$ | 4,903 |
| $CO_2$ | 724 |

This gas exits the drier at approximately 160° F., having a relative humidity of 25.7 percent. In passing through the drier the water content of the rubber crumb is lowered to 0.5 weight percent.

In a preferred embodiment of the drier, the blowers have the following capacities:

Exhaust fan (64) 30 H.P. 26,500 c.f.m., 4" water $\Delta$ P
Air blower (20) 25 H.P. 9,000 c.f.m., 10" water $\Delta$ P
Top pass circ. fan (42) 60 H.P. 78,000 c.f.m., 3" water $\Delta$ P
Middle pass circ. fan (43) 50 H.P. 62,000 c.f.m., 3" water $\Delta$ P
Bottom pass circ. fan (44) 40 H.P. 50,000 c.f.m., 3" water $\Delta$ P (Numbers in ( ) refer to elements in FIG. 1)

Each kicker-doffer unit (1 for each belt) is operated by a 1 H.P. motor with reducer. The screw conveyor (element 15) for collecting the dried rubber is operated by a 3 H.P. drive.

Certain modifications of the invention will become apparent to those skilled in the art and the illustrative details disclosed are not to be construed as imposing unnecessary limitations on the invention.

We claim:

1. Apparatus for drying particulate solid materials comprising, in combination, a drying chamber having a plurality of generally horizontal perforate conveyor belts at spaced levels therein to provide a plurality of passes for said material across said chamber, each belt except the lowest delivering said material to the next lower belt; perforate floors across said chamber between said belts dividing said chamber into a compartment for each of said belts; blower means for each compartment for circulating drying gas thru the conveyor belt therein; a separate hot drying gas inlet line extending thru the wall of said chamber to each compartment; an effluent gas line in the top section of the uppermost compartment of said chamber; an exhaust blower in said effluent line; an intake gas line leading into the upper section of the lowermost compartment of said chamber; means for feeding said material into said chamber to the uppermost conveyor belt; means for passing dried material from the lowermost conveyor belt out of said chamber; a furnace outside of said chamber for producing hot combustion gas; a manifold line connected with each said hot gas inlet line; a hot gas line leading from the stack of said furnace to said manifold line; an air line having a blower therein leading into said hot gas line; and means for controlling the temperature of the gas in said hot gas line.

2. The apparatus of claim 1 wherein said means for controlling temperature in said hot gas line comprises a motor valve in the fuel line to said furnace and a temperature controller sensitive to temperature in said hot gas line and in control of said motor valve.

3. The apparatus of claim 1 wherein last said means comprises a separate motor valve in each said hot gas inlet line between said manifold line and said chamber; and a separate temperature controller for each pass sensitive to the temperature of gas entering same and in operative control of the motor valve in the hot gas line feeding said pass.

4. The apparatus of claim 3 including a high temperature shutdown motor valve in said hot gas line intermediate said manifold line and said air line and a high temperature shutdown motor valve in said exhaust line, each said temperature controller being operatively connected with each said shutdown motor valve and with said exhaust blower and each said blower means for sensing a maximum temperature in its respective pass and shutting same down.

5. Apparatus for drying particulate solids comprising in combination a drying chamber containing a plurality of generally horizontal compartments separated by perforate floors; a perforate endless conveyor belt extending laterally thru each compartment, each succeeding belt being adapted to receive solids from the preceding belt and convey same in the opposite direction from the preceding belt; means at the delivery end of each belt, except the lowermost, for transferring said material to the next lower belt; conveyor means at the delivery end of the lowermost belt for recovery of dried solids; means for delivering solids onto the receiving end of the uppermost conveyor belt; gas locks adjacent both ends of said conveyor belts forming said compartments with said floors; a blower outside said chamber for each said compartment; a gas delivery conduit in each compartment extending therethru above and transversely to the belt therein and perforate along the underside thereof, said conduit being connected with the exhaust outlet of the blower of its respective compartment; a gas intake conduit in each compartment positioned below the loaded section of the belt therein and perforate along the upper side, said intake conduit being connected with the intake of the blower of its respective compartment; a hot drying gas manifold connected by separate feed lines to the intakes of said blowers; a source of hot drying gas connected with said manifold; an air intake line connected with the intake of the blower supplying the lowermost compartment; an exhaust line leading from the uppermost compartment having an exhaust blower therein.

6. The apparatus of claim 5 including a separate motor valve in each separate feed line; and a separate temperature controller operatively connected with each said motor valve, being sensitive to the temperature of the gas delivered to its respective pass and adapted to control its respective valve so as to maintain the temperature of said gas within a desired range.

7. The apparatus of claim 5 including in each compartment perforate longitudinal distribution conduits above said belt in communication with said delivery conduit thru the perforations therein and a plurality of perforate longitudinal pickup conduits below the loaded section of said belt in communication with the perforations in said intake conduit.

8. Apparatus for drying particulate solid materials comprising in combination, a box-like drying chamber having a plurality of generally horizontal perforate endless conveyor belts at spaced levels therein mounted on rotatable rolls to provide a plurality of passes for said material from end to end of said dryer, each belt except the lowest delivering said material to the next lower belt and operating in the opposite direction from the belt immediately above; a perforate floor in said chamber between each pair of adjacent belts and terminating short of the rolls at the ends of said belts; upright airlocks at both ends of said floors forming separate compartments with said floors for each pass and each belt, each airlock comprising a pair of spaced-apart bulkheads each provided with vanes thru which the conveyor belts pass, each vane providing a loose seal with its belt; blower means for each compartment for circulating drying gas thru the conveyor belt therein; a separate hot drying gas inlet line leading into each compartment; an effluent gas line in the top section of the uppermost compartment; an exhaust blower in said effluent gas line; an intake drying gas line leading into the lowermost compartment; means for feeding said material into said chamber to the pickup end of the uppermost conveyor belt; and means for passing dried material from the delivery end of the lowermost conveyor belt out of said chamber.

9. The apparatus of claim 8 including baffle means adjacent the receiving end of the uppermost conveyor belt for distributing material on said belt; means adjacent the delivery end of each belt, except the lowermost, for removing said material from the belt and directing same to the receiving end of the next lower belt; a conveyor extending along and below the delivery end of the lowermost belt; and means for discharging material from the delivery end of the lowermost belt to said conveyor.

10. A process for drying particulate solid material comprising passing said material in a series of generally horizontal passes across an enclosed drying zone, each pass after the first being progressively lower than the preceding pass; passing a hot drying gas separately into said zone above each pass thru a plurality of longitudinally spaced zones into contact with said material; introducing air into said drying zone above the lowermost pass; exhausting said drying gas and air from said drying zone above said first pass at a rate sufficient to assure overall upward flow of gas thru said passes; simultaneously withdrawing a mixture of drying gas and air from just below each said pass thru a plurality of restricted, longitudinally spaced zones so as to cause said mixture to pass downwardly thru the material in each pass; and reintroducing the withdrawn mixture from each pass to said zone immediately above the pass from which it is withdrawn in admixture with said hot drying gas.

11. The process of claim 10 wherein said hot drying gas consists essentially of combustion gas tempered with air.

12. The process of claim 10 including the steps of sensing the ambient temperature adjacent each pass and separately regulating the separate flow of said hot drying gas thereto so as to maintain a predetermined temperature therein.

13. The process of claim 10 wherein said material consists essentially of rubber crumb and the temperature of said hot drying gas is maintained in the range of about 300° to 800° F. and the ambient temperature of each pass is maintained in the range of about 150° to 225° F.

References Cited in the file of this patent
UNITED STATES PATENTS

| | | |
|---|---|---|
| 582,087 | Pratt | May 4, 1897 |
| 1,421,856 | Stone | July 4, 1922 |
| 1,520,187 | Lawson | Dec. 23, 1924 |
| 1,562,763 | Harris | Nov. 24, 1925 |
| 1,706,993 | Baker | Mar. 26, 1929 |
| 1,797,335 | Fedeler | Mar. 24, 1931 |
| 2,151,527 | Podmore | Mar. 21, 1939 |
| 2,466,130 | Surico | Apr. 5, 1949 |
| 2,760,410 | Gillis | Aug. 28, 1956 |
| 2,784,685 | Naylor et al. | Mar. 12, 1957 |
| 2,995,829 | Allen | Aug. 15, 1961 |
| 3,023,513 | Herte | Mar. 6, 1962 |

FOREIGN PATENTS

| | | |
|---|---|---|
| 334,952 | Great Britain | Sept. 15, 1930 |